US006707872B2

(12) United States Patent
Yoon et al.

(10) Patent No.: US 6,707,872 B2
(45) Date of Patent: Mar. 16, 2004

(54) SPACER GRID FOR NUCLEAR REACTOR FUEL ASSEMBLIES WITH GRID SPRINGS MAINTAINING CONFORMAL CONTACT WITH FUEL RODS AND ENLARGED ELASTIC RANGE

(75) Inventors: Kyung Ho Yoon, Taejon-si (KR); Heung Seok Kang, Taejon-si (KR); Hyung Kyu Kim, Taejon-si (KR); Kee Nam Song, Taejon-si (KR); Youn Ho Jung, Taejon-si (KR); Tae Hyun Chun, Taejon-si (KR); Dong Seok Oh, Taejon-si (KR); Wang Kee In, Taejon-si (KR); Gyung Jin Park, Seoul (KR)

(73) Assignees: Korea Atomic Energy Research Institute, Taejon-si (KR); Korea Hydro & Nuclear Power Co., Ltd., Seoul (KR)

( * ) Notice: Subject to any disclaimer, the term of this patent is extended or adjusted under 35 U.S.C. 154(b) by 0 days.

(21) Appl. No.: 10/010,526

(22) Filed: Dec. 7, 2001

(65) Prior Publication Data

US 2003/0012329 A1 Jan. 16, 2003

(30) Foreign Application Priority Data

Jul. 10, 2001 (KR) ........................................ 2001-41360

(51) Int. Cl.[7] ................................................. G21C 3/34
(52) U.S. Cl. ........................ 376/442; 376/441; 376/462
(58) Field of Search ................................ 376/441, 442, 376/462

(56) References Cited

U.S. PATENT DOCUMENTS

| 4,396,573 A | * | 8/1983 | Feutrel | 376/442 |
| 4,659,542 A | * | 4/1987 | Kerrey | 376/442 |
| 4,744,942 A | * | 5/1988 | Ferrari et al. | 376/442 |
| 4,780,272 A | * | 10/1988 | Arene et al. | 376/361 |
| 5,139,736 A | * | 8/1992 | Bryan | 376/442 |
| 5,272,743 A | * | 12/1993 | Yamazaki et al. | 376/463 |
| 5,289,515 A | * | 2/1994 | Oyama et al. | 376/442 |
| 5,444,748 A | * | 8/1995 | Beuchel et al. | 376/438 |
| 6,167,105 A | | 12/2000 | Yoon et al. | |
| 6,236,702 B1 | * | 5/2001 | Chun et al. | 376/462 |

FOREIGN PATENT DOCUMENTS

| FR | WO 99/03108 | * | 1/1999 |
| NL | 7209512-Q | * | 1/1973 |

* cited by examiner

Primary Examiner—Michael J. Carone
Assistant Examiner—R Palabrica
(74) Attorney, Agent, or Firm—Bachman & LaPointe, P.C.

(57) ABSTRACT

A spacer grid used for placing and supporting fuel rods in nuclear reactor fuel assemblies is disclosed. The spacer grid of this invention has a plurality of grid springs designed to have an optimal shape of their vertical support parts, thus reducing fretting wear of the fuel rods caused by contact of the fuel rods with the grid springs. The grid spring has a vertical support part and a fuel rod support part. The vertical support part includes upper and lower base parts extending downward and upward from the central portions of the top and bottom edges of an opening formed at the central portion of a unit strip, and two bridge parts branched from the upper base part and extending symmetrically downward until they are united at the lower base part. The fuel rod support part includes a conformal support part brought into surface contact with the external surface of a fuel rod. Two transverse connection parts extend outward from the opposite outside edges of the conformal support part while being specifically bent, and are integrated with the central portions of the inside edges of the two bridge parts into a single structure, thus connecting the fuel rod support part to the vertical support part.

7 Claims, 17 Drawing Sheets

SPACER GRID FOR NUCLEAR REACTOR FUEL ASSEMBLIES WITH GRID SPRINGS MAINTAINING CONFORMAL CONTACT WITH FUEL RODS AND ENLARGED ELASTIC RANGE

BACKGROUND OF THE INVENTION

1. Field of the Invention

The present invention relates, in general, to spacer grids used for placing and supporting fuel rods in nuclear reactor fuel assemblies and, more particularly, to a spacer grid with grid springs designed to have an optimal shape of their vertical support parts, thus reducing fretting wear of the fuel rods caused by contact of the fuel rods with the grid springs, the grid springs also designed to optimize the distribution and to minimize the intensity of contact stress caused by the contact between the springs and the fuel rods, thus being less likely to cause fretting wear of the fuel rods and stably placing and supporting the fuel rods in the assembly during the effective life of the fuel rods expires, and thereby improving the soundness of the assembly.

2. Description of the Prior Art

As well known to those skilled in the art, spacer grids are elements of a nuclear reactor fuel assembly, and each has a plurality of grid springs and dimples in their fuel rod cells for placing and supporting a plurality of fuel rods within the spacer grids of the fuel assembly.

FIG. 1 is an exploded perspective view, showing the construction of a typical nuclear reactor fuel assembly. FIG. 2a is a plan view, showing a conventional spacer grid used in the fuel assembly of FIG. 1.

FIG. 2b is a side view of the spacer grid of FIG. 2a, with one fuel rod placed and supported by grid springs and dimples within a fuel rod cell of the spacer grid of FIG. 2a. FIG. 3 is a sectional view, showing a deformation of a conventional grid spring due to a force applied from a fuel rod set in the cell of the spacer grid of FIG. 2a.

FIG. 4a is a perspective view of a conventional grid spring used in the prior art spacer grid. FIG. 4b is a perspective view of a conventional dimple used in the prior art spacer grid.

In a typical nuclear reactor fuel assembly 2 having a plurality of spacer grids 110, a plurality of guide tubes 113 are vertically arranged between top and bottom support pallets 111 and 112.

The spacer grids 110 for placing and supporting the fuel rods 125 in the assembly 2 are arranged along the guide tubes 113 at regular intervals in a vertical direction, and fixed to the tubes 113 through a welding process.

Each of the spacer grids 110 is made of a zircaloy or Inconel, and defines both a plurality of fuel rod cells 123 for supporting the fuel rods 125 and a plurality of guide tube cells 124 for supporting the guide tubes 113. Each of the fuel rod cells 123 has two grid springs 118 and four dimples 119, and so the fuel rod 125 inside each fuel rod cell 123 is supported at six positions through point contact-type support and surface contact-type support. The four dimples 119 are arranged in each fuel rod cell 123 such that two dimples 119 are formed at positions above and under each grid spring 118.

Since the grid springs 118 of the spacer grid 110 are brought into direct contact with the fuel rods 125, the springs 118 may be deformed by the fuel rods 125. That is, the vertical support parts 121 or the root parts of a grid spring 118 may be depressed due to the force applied from a fuel rod 125 to the grid spring 118 as shown in FIG. 3. In such a case, as the strength of the vertical support parts 121 of each grid spring 118 is almost equal to that of the central curved support part 122 of the spring 118 at which the spring 118 comes into direct contact with the fuel rod 125, the vertical support parts 121 of the spring 118 are deformed by both a bending moment 131 and a twisting moment 132 caused by the force applied from the fuel rod 125 to the spring 118 at the same time. Such simultaneous application of the bending moment 131 and twisting moment 132 to the vertical support parts 121 of the springs 118 prevents the springs 118 from stably supporting the fuel rods 125, in addition to making the springs 118 fail to effectively resist fatigue due to stress. In addition, the external surface of the fuel rod 125 may slide slightly on the central curved support part 122 of the spring 118 in the case of the application of the bending moment and twisting moment to the spring 118. In such a case, a fretting wear of the fuel rods 125 inside the spacer grid 110 may be easily caused by sliding movement.

In the spacer grid 110, the grid springs 118 and the dimples 119 of each fuel rod cell 123 have the same radius of curvature as that of the fuel rods 125 to accomplish conformal contact of the springs 118 and dimples 119 with the fuel rod 125. However, the strength of the vertical support parts 121 of each spring 118 is almost equal to that of the central curved support part 122 of the spring 118 as described above, and so the two parts 121 and 122 are deformed at the same time when a force is applied from the rods 125 to the spring 118.

Therefore, the external surface of the fuel rod 125 slides slightly on the central curved support part 122 of the spring 118, while the vertical support parts 121 of the spring 118 is deformed by the bending moment and twisting moment applied from the fuel rod 125 to the spring 118. Therefore, the vertical support parts 121 are bent in a loaded direction in addition to being distorted.

When the grid springs 118 and dimples 119 of the conventional spacer grids 110 have insufficient spring force, it is almost impossible for them to stably place and support the fuel rods 125 at desired positions inside the assembly 2, thus reducing the soundness of the fuel assemblies. On the contrary, when the grid springs 118 and dimples 119 of the conventional spacer grid 110 are too high in their spring forces, there may be formed excessive frictional force between the fuel rods 125 and the spacer grids 110 during an insertion of the fuel rods 125 into the cells 123 of the grids 110. Such an excessive frictional force may cause damages, such as scratches, on the external surface of the fuel rods 125, and fail to appropriately support the fuel rods 125 in the case of lengthwise growth of the fuel rods due to neutron radiation during the operation of a nuclear reactor. In such a case, the fuel rods 125 may be undesirably bent.

When the fuel rods 125 bend as described above, the rods 125 become closer to each other to be sometimes brought into undesired contact with each other, thus making the coolant channels between the fuel rods 125 of the fuel assembly 2 become narrower or closed. In such a case, it could impede the effective heat transfer from the fuel rods 125 to the coolant, and so the fuel rods 125 may be partially overheated, thus sometimes causing a DNB (Departure from Nucleated Boiling) and reducing the output power of the nuclear fuel.

The recent trend of development in the nuclear reactor fuel assemblies aims at the provision of high burn-up and defect-free nuclear fuel.

Particularly, in order to provide desired high burn-up nuclear fuel, it is necessary to improve the heat transfer efficiency between the fuel rods and the coolant in the nuclear reactor fuel assembly. The above object may be accomplished by designing the nuclear reactor fuel assembly to allow the coolant to enhance the mixing flow around the fuel rods in the assembly.

In an effort to accomplish such mixing flow of coolant within the nuclear reactor fuel assembly, several types of spacer grids having new structures have been proposed. For example, the mixing flow of the coolant may be accomplished by attaching specifically designed mixing vanes in the fuel assembly or providing effective coolant channels in the assembly.

The conventional techniques for mixing flow of coolant in the nuclear reactor fuel assemblies are based on the formation of more active turbulent flow of coolant with high Reynolds number around the fuel rods of the assembly. Therefore, the conventional techniques undesirably induce the fuel rod vibration in the assembly due to the active turbulent flow of coolant. Such vibration of the fuel rods in the nuclear fuel assemblies is a so-called "flow-induced vibration".

The flow induced vibration of the fuel rods in the nuclear reactor fuel assembly makes the fuel rods slide or move relative to the grid springs and dimples at their contact surfaces, thus partially rubbing the contact surfaces of the fuel rods due to frictional force. The flow-induced vibration of the fuel rods finally causes a fretting wear of the fuel rods.

The technique for improving the thermal efficiency of the nuclear fuel assembly and providing highly combustible nuclear fuel undesirably damages the fuel rods.

While designing the spacer grids for nuclear fuel assemblies, it is necessary to accomplish the following two requirements. That is, the spacer grids must stably support the fuel rods during the effective life of the fuel rods, in addition to being free from causing a fretting wear of the fuel rods.

First, in order to allow the spacer grids to stably support the fuel rods within a nuclear reactor fuel assembly during the effective life of the fuel rods, the spacer grids must be designed such that they effectively support the fuel rods with sufficient spring force of their grid springs and dimples. In addition, it is necessary to enlarge the elastic range of the grid springs and dimples, thus maintaining a desired spring force regardless of variable fuel rod support conditions inside the fuel assembly during the effective life of the fuel rods.

However, the grid springs and dimples of a conventional spacer grid for nuclear fuel assemblies gradually lose their original spring forces due to a neutron radiation during an operation of a nuclear reactor. Therefore, the grid springs and dimples may fail to desirably support the fuel rods, and there may be formed gaps between them. Due to such gaps, the spacer grids do not stably support the fuel rods, but undesirably allow the fuel rods to move by the flow of coolant. The spacer grids thus reduce the soundness of the nuclear reactor fuel assemblies.

Second, the protection of the fuel rods from fretting wear in a nuclear reactor fuel assembly may be accomplished by removing the causes of such fretting wear.

The causes of such fretting wear of fuel rods in a nuclear reactor fuel assembly include gaps formed between the grid springs, dimples and fuel rods. The gaps may be formed by a reduction in the spring force of the grid springs and dimples due to neutron radiation, a difference in the thermal expansion between the fuel rods and spacer grids, and a reduction in the diameter of the fuel rods caused by a lengthwise growth of the fuel rods. When such gaps are formed between the grid springs, dimples and fuel rods, the fuel rods are repeatedly brought into contact with and removed from the grid springs and dimples due to axial and transversal flow of coolant, and thus occurring feasibility of the fretting wear is increased.

SUMMARY OF THE INVENTION

Accordingly, the present invention has been made keeping in mind the above problems occurring in the prior art, and an object of the present invention is to provide a spacer grid for nuclear reactor fuel assemblies, which has a plurality of grid springs designed to have an optimal shape of their vertical support parts, thus allowing the vertical support parts of the grid springs to be deformed only by a bending moment in the case of an application of a force from the fuel rods to the springs, and which thus continuously maintains the desired conformal surface contact between the grid springs, dimples and the fuel rods regardless of any directional movement of the fuel rods within the fuel assembly, and reduces the fretting wear of the fuel rods caused by abnormal contact between the grid springs and fuel rods.

Another object of the present invention is to provide a spacer grid for nuclear reactor fuel assemblies, of which the grid springs have an optimal shape suitable for maintaining the desired conformal surface contact between the grid springs and the fuel rods during an operation of the fuel assembly, in addition to optimize the distribution and to minimize the intensity of contact stress caused by the contact between the grid springs and the fuel rods, thus effectively reducing the fretting wear of the fuel rods caused by abnormal contact between the grid springs and fuel rods.

A further object of the present invention is to provide a spacer grid for nuclear reactor fuel assemblies, of which the grid springs have an optimal shape of their vertical support parts, such that the springs enlarge their elastic range in a spring characteristic diagram or a force-displacement diagram, and which thus maintains the spring force capable of effectively supporting the fuel rod within the elastic limit of the springs, thus almost completely preventing an excessive plastic deformation of the grid springs during an insertion of the fuel rods into the spacer grids, in addition to stably placing and supporting the fuel rods in the fuel assembly during the effective life of the fuel rods, irrespective of variable fuel rod support conditions of the fuel assembly during an operation of a nuclear reactor.

In order to accomplish the above objects, the present invention provides a spacer grid for placing and supporting a plurality of longitudinal fuel rods in a nuclear reactor fuel assembly, comprising a plurality of inner strips arranged while intersecting each other at right angles prior to being encircled with four perimeter strips, thus forming an egg-crate pattern, the inner and perimeter strips each being fabricated with a plurality of unit strips arranged in parallel, and forming a plurality of four-walled fuel rod cells for receiving and supporting the fuel rods therein while isolating the fuel rods from each other, each unit strip of the inner strips having one grid spring formed on a central portion of the unit strip while projecting in a direction, and two dimples formed on the unit strip at positions above and under the grid spring while projecting in a direction opposite to the grid spring, and each unit strip of the perimeter strips having one grid spring formed on a central portion of the unit strip while projecting in a direction, wherein the grid spring comprises:

a vertical support part including: an opening formed at the central portion of the unit strip; upper and lower base parts extending downward and upward from central portions of top and bottom edges of the opening; and two bridge parts branched from the upper base part and extending symmetrically downward until they are united at the lower base part; and a fuel rod support part including: a conformal support part brought into surface contact with an external surface of a fuel rod; and two transverse connection parts extending outward from opposite outside edges of the conformal support part while being specifically bent, and integrated with the central portions of inside edges of the two bridge parts into a single structure, thus connecting the fuel rod support part to the vertical support part.

In the spacer grid, the vertical support part has a plurality of bent portions and projects from the unit strip toward the fuel rod, thus elastically supporting load applied from the fuel rod thereto through the conformal support part 45 coming into direct contact with the fuel rod.

The conformal support part has the same radius of curvature as that of the fuel rod, thus being brought into surface contact with the external surface of the fuel rod, the conformal support part also having a circular or elliptical profile at its contact surface, thus enlarging a surface contact area thereof relative to the fuel rod, in addition to accomplishing a uniform contact pressure distribution and reducing a peak stress thereof.

The vertical support part is shaped through a bending process, and so its strength is relatively lower than that of the fuel rod support part having the conformal support part, the vertical support part being thus elastically deformed prior to a deformation of the conformal support part so as to allow the conformal support part to maintain a conformal contact with the fuel rod in the case of an application of a force from the fuel rod to the grid spring.

The vertical support part, including the upper and lower base parts and two bridge parts, further includes a plurality of bent portions formed through a bending process, thus being mainly affected by a bending moment, with a twisting moment-induced deformation of the vertical support part being minimized.

The vertical support part is bent at a plurality of portions through a bending process, thus having an enlarged elastic range and elastically supporting the fuel rod regardless of a variation in fuel rod support conditions in the nuclear reactor, and maintaining a spring force capable of effectively supporting the fuel rod within the elastic limit of the grid spring.

In the spacer grid, the base parts and bridge parts of the vertical support part are changeable in their widths and positions of their bent portions in accordance with design objects, thus providing optimized spring characteristic curves.

In addition, the dimples of the spacer grid have the same radius of curvature as that of the fuel rods, thus having curved contact surfaces capable of coming into conformal surface contact with the external surfaces of the fuel rods.

The dimples and conformal support parts of the grid springs are rounded or curved at their upper and lower edges in a direction opposite to the contact surfaces thereof with the fuel rods.

In another embodiment of the present invention, the grid spring of the present invention have upper and lower opening surrounded by the vertical support part and the fuel rod support part, and further include upper and lower extending part each extending from center of upper/lower base part of the vertical support part and partially enclosing said upper/lower opening.

BRIEF DESCRIPTION OF THE DRAWINGS

The above and other objects, features and other advantages of the present invention will be more clearly understood from the following detailed description taken in conjunction with the accompanying drawings, in which:

FIG. 2b is a side view of the spacer grid of FIG. 2a, with one fuel rod placed and supported by grid springs and dimples within a fuel rod cell of the spacer grid of FIG. 2a;

FIG. 3 is a view, showing a deformation of a conventional grid spring due to an external force applied from the fuel rod in the spacer grid of FIG. 2a;

FIG. 9b is a perspective view of the fuel rod cell of FIG. 9a;

DESCRIPTION OF THE PREFERRED EMBODIMENTS

Figure 1:
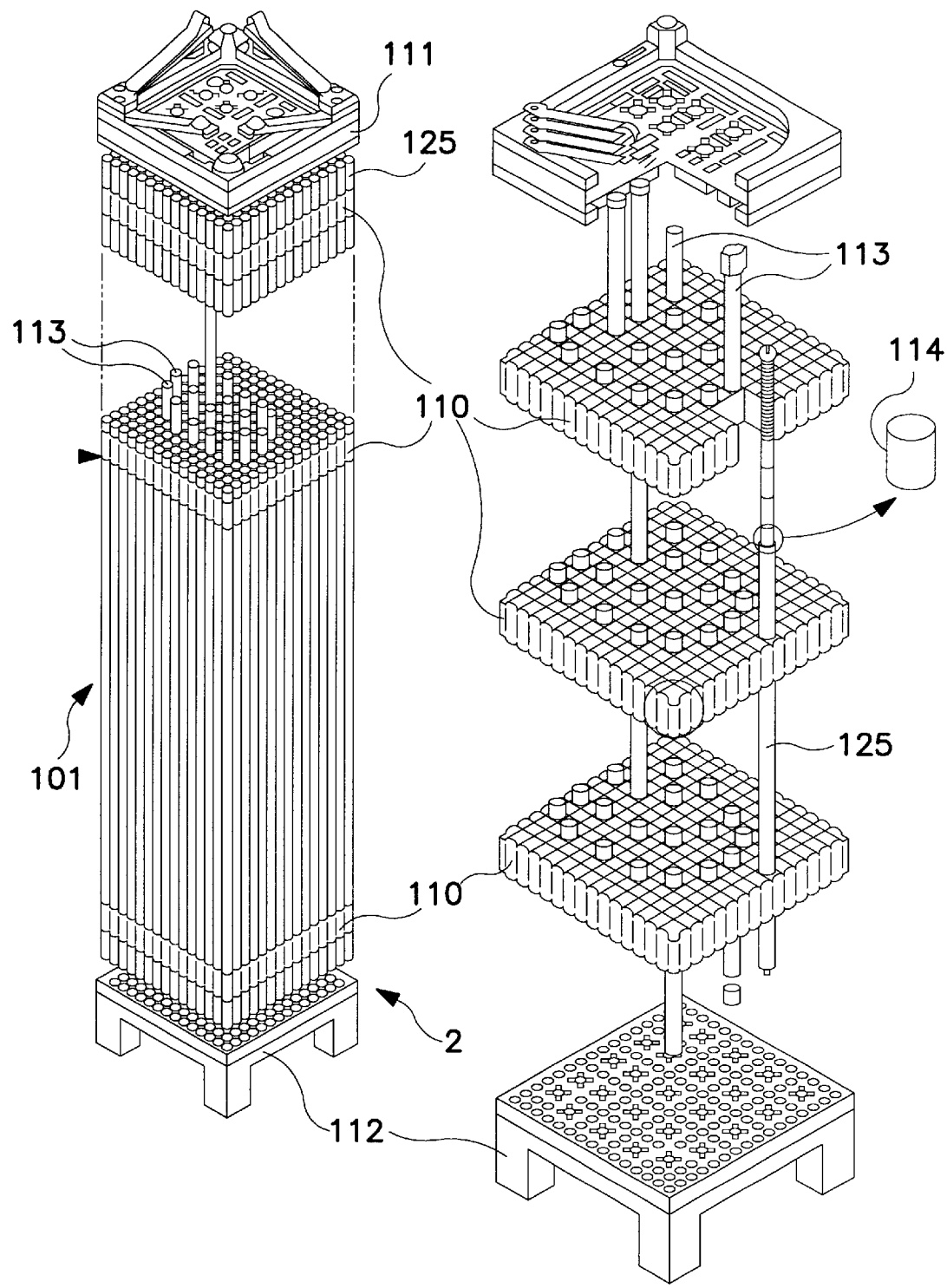
FIG. 1 is an exploded perspective view, showing the construction of a typical nuclear fuel assembly.
Figure 2A:
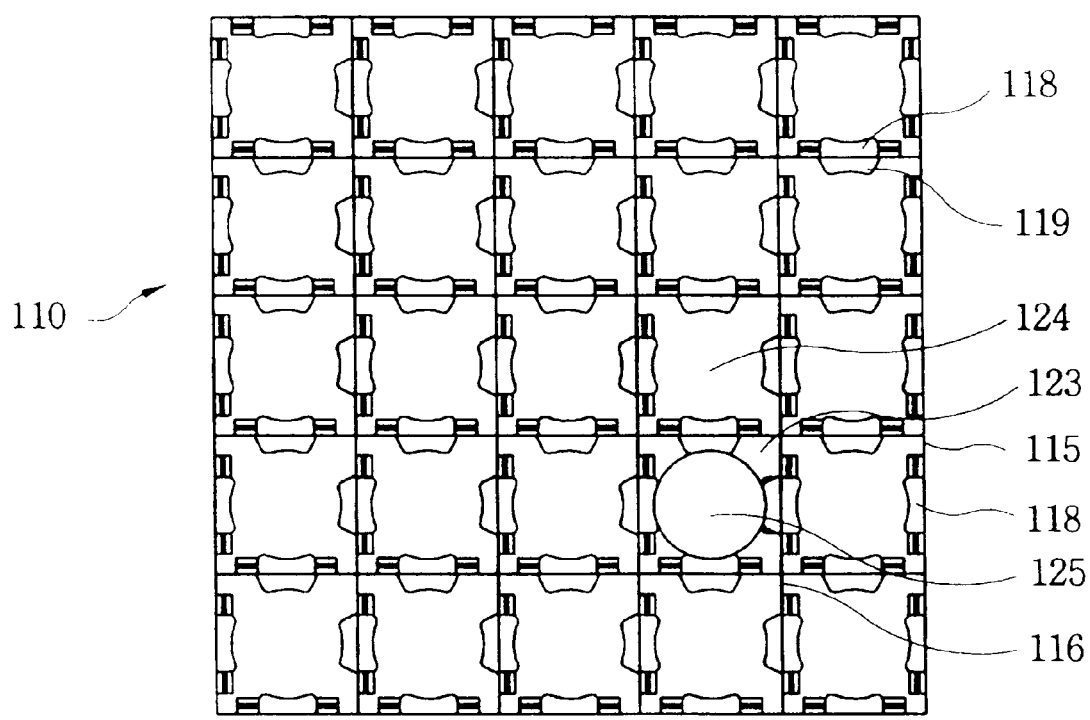
FIG. 2a is a plan view, showing a conventional spacer grid used for placing and supporting elongated fuel rods within the nuclear fuel assembly of FIG. 1.
Figure 2B:
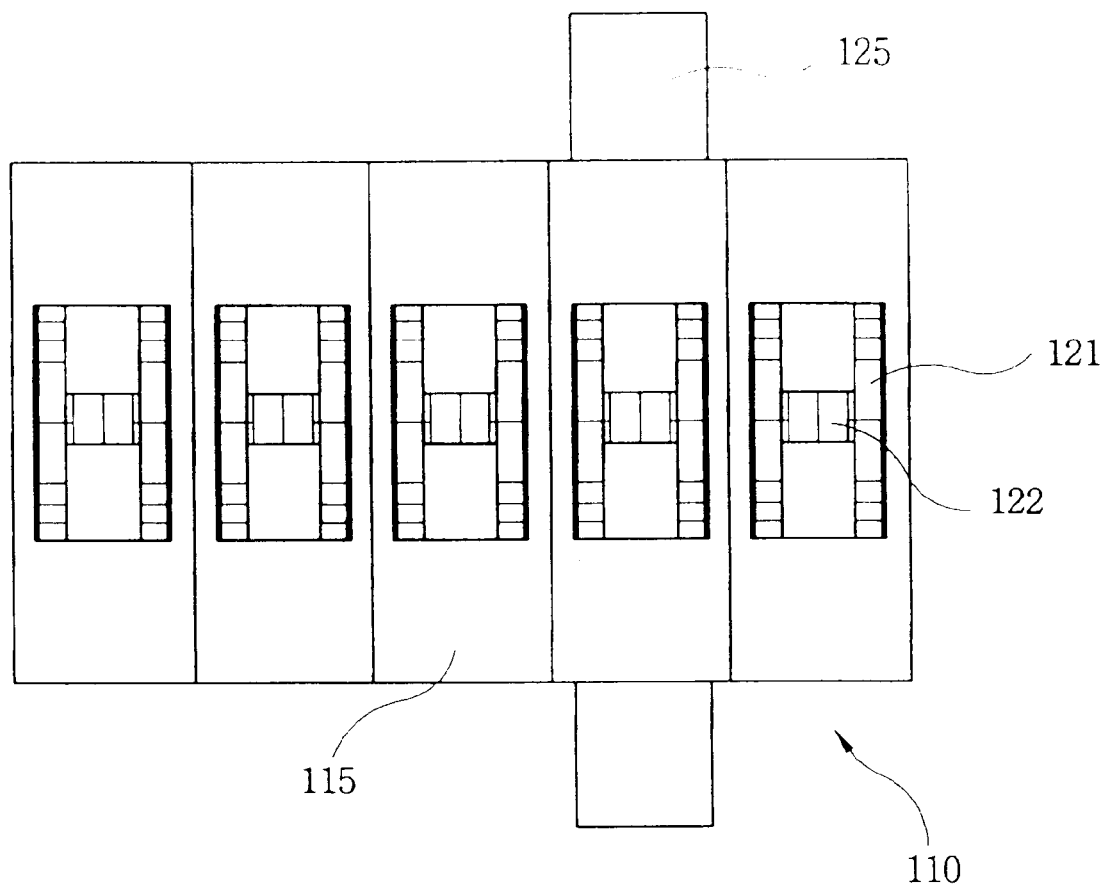
Figure 3:
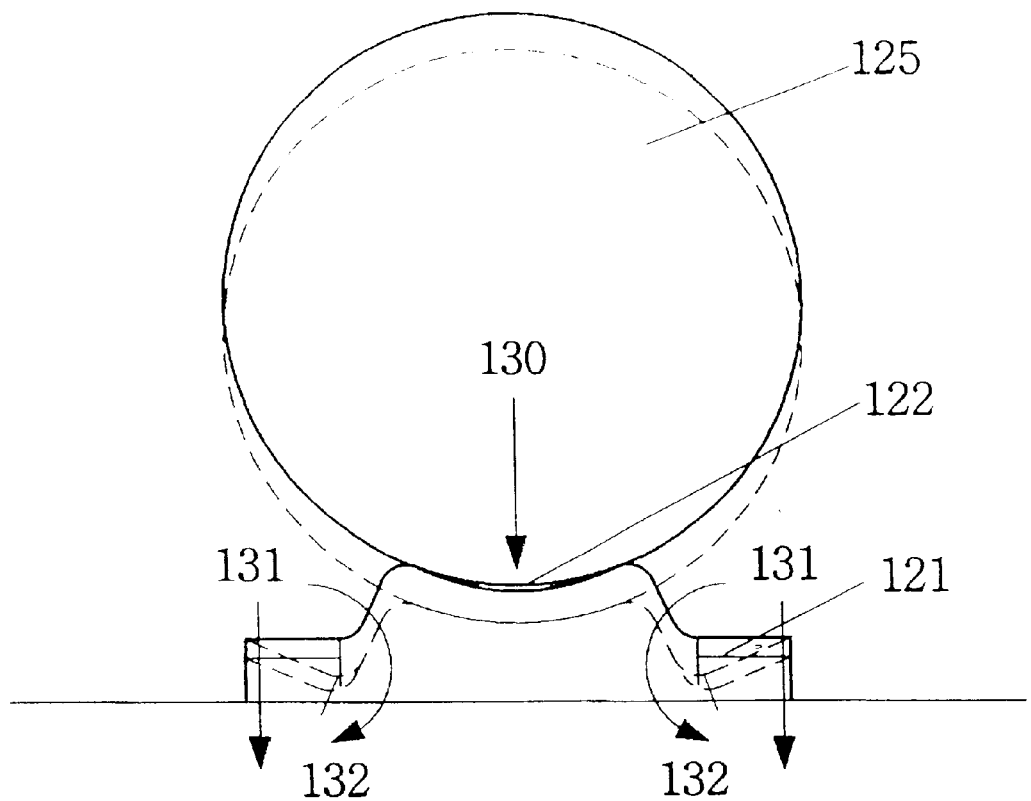
Figure 4:
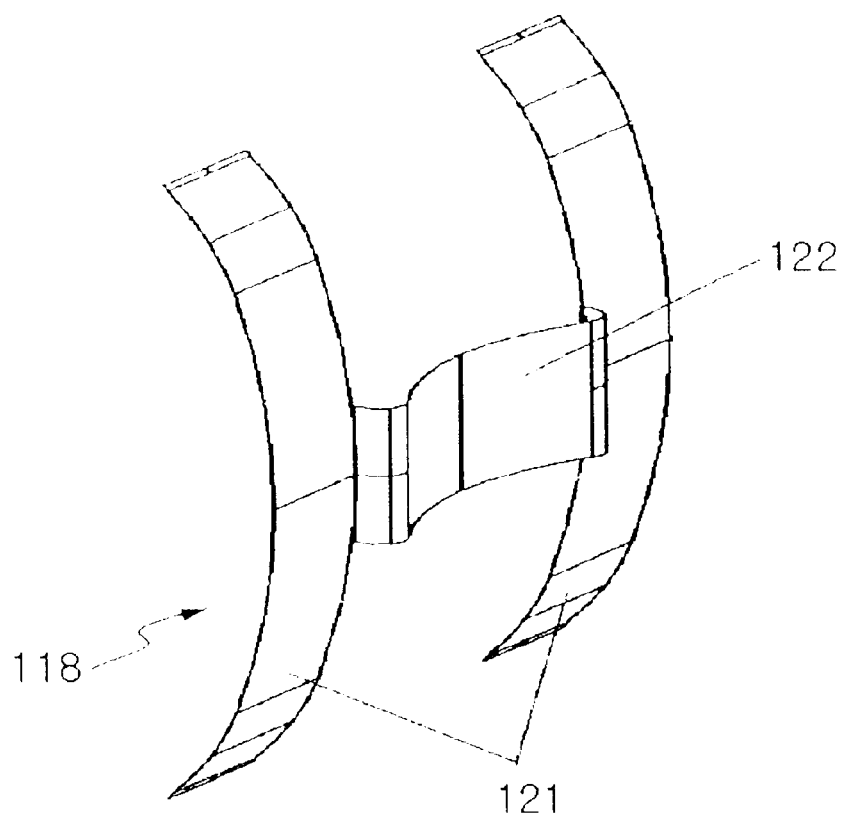
FIG. 4a is a perspective view of a conventional grid spring used in the spacer grid.
FIG. 4b is a perspective view of a conventional dimple used in the spacer grid.
Figure 4:
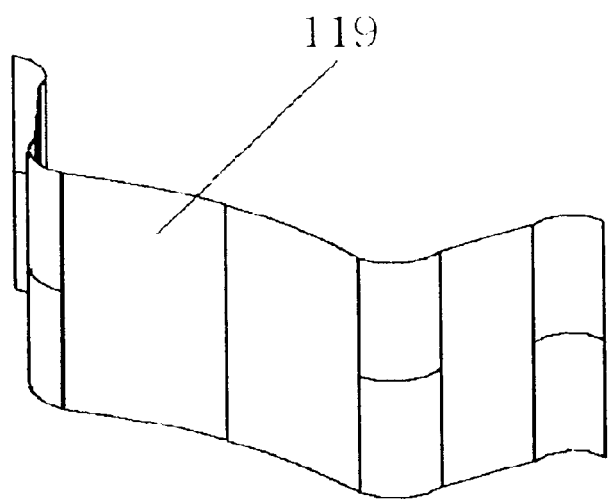
Figure 5:
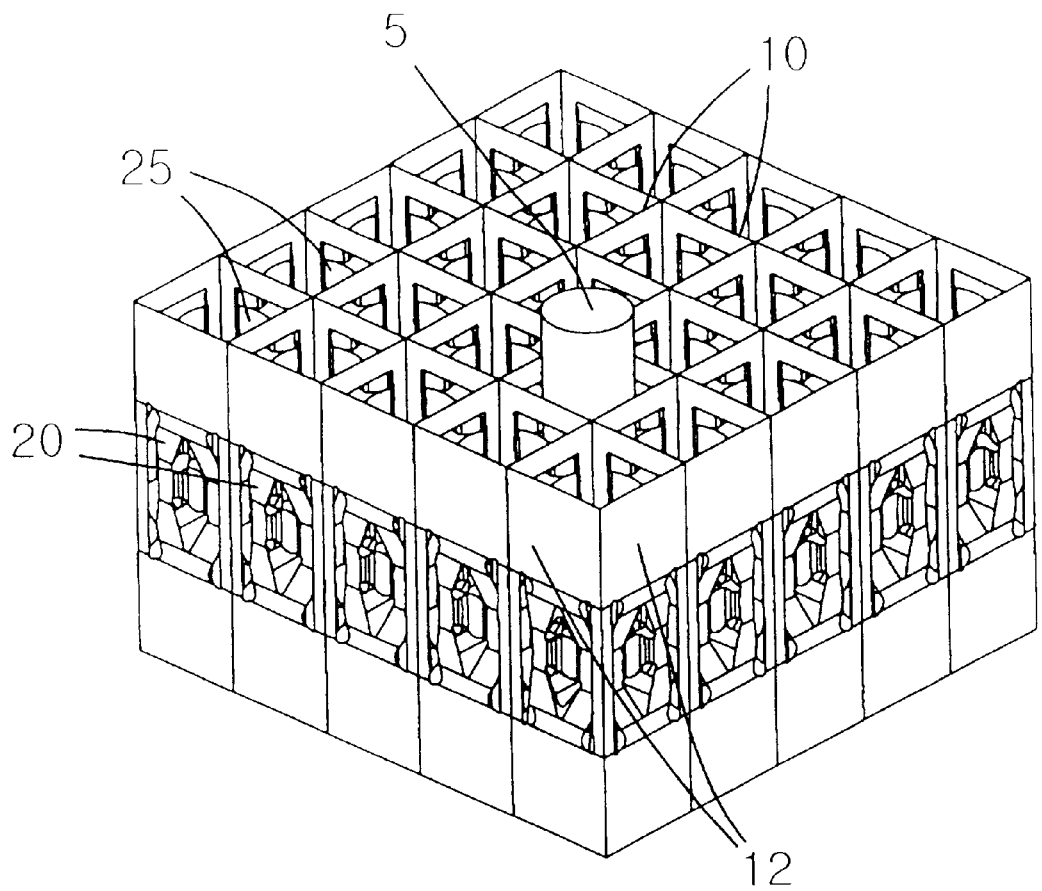
FIG. 5 is a perspective view of a spacer grid according to the preferred embodiment of this invention.
Figure 6A:
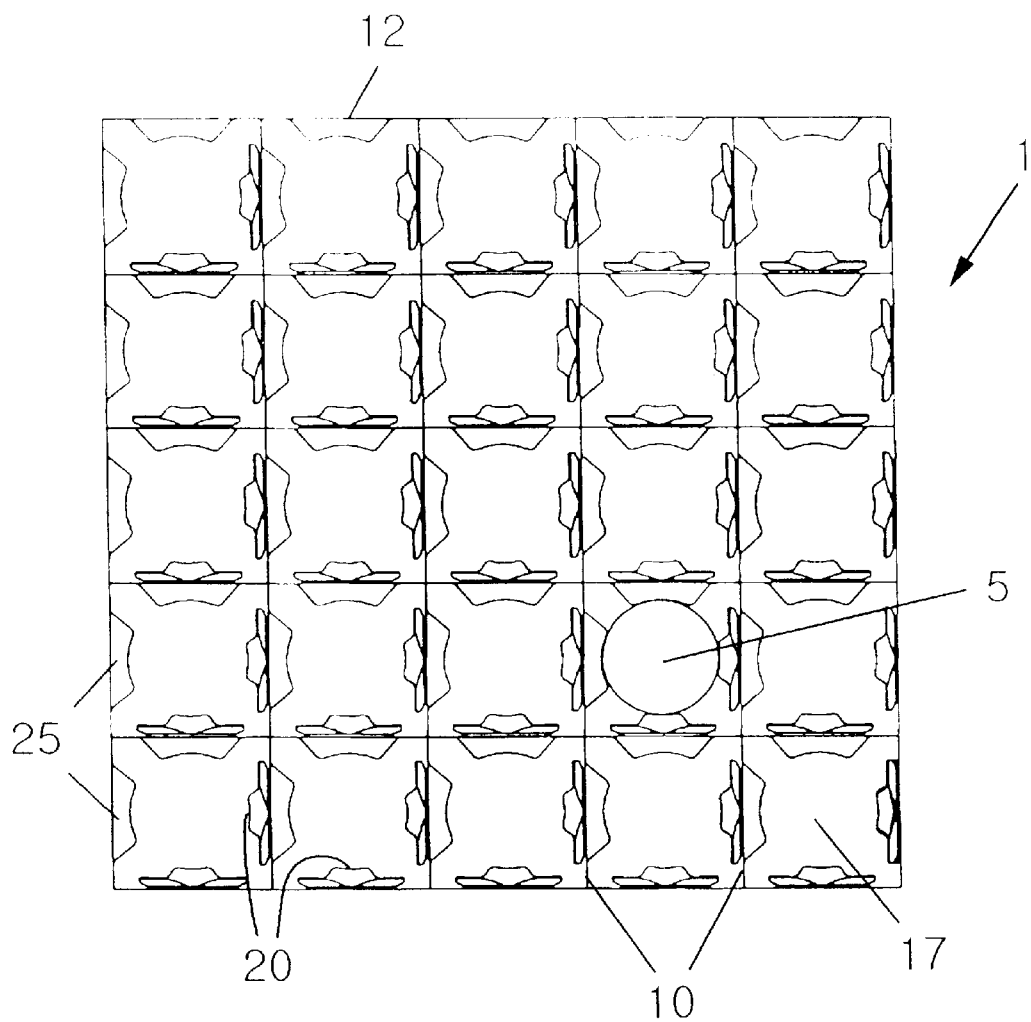
FIG. 6a is a plan view of the spacer grid of this invention.
Figure 6B:
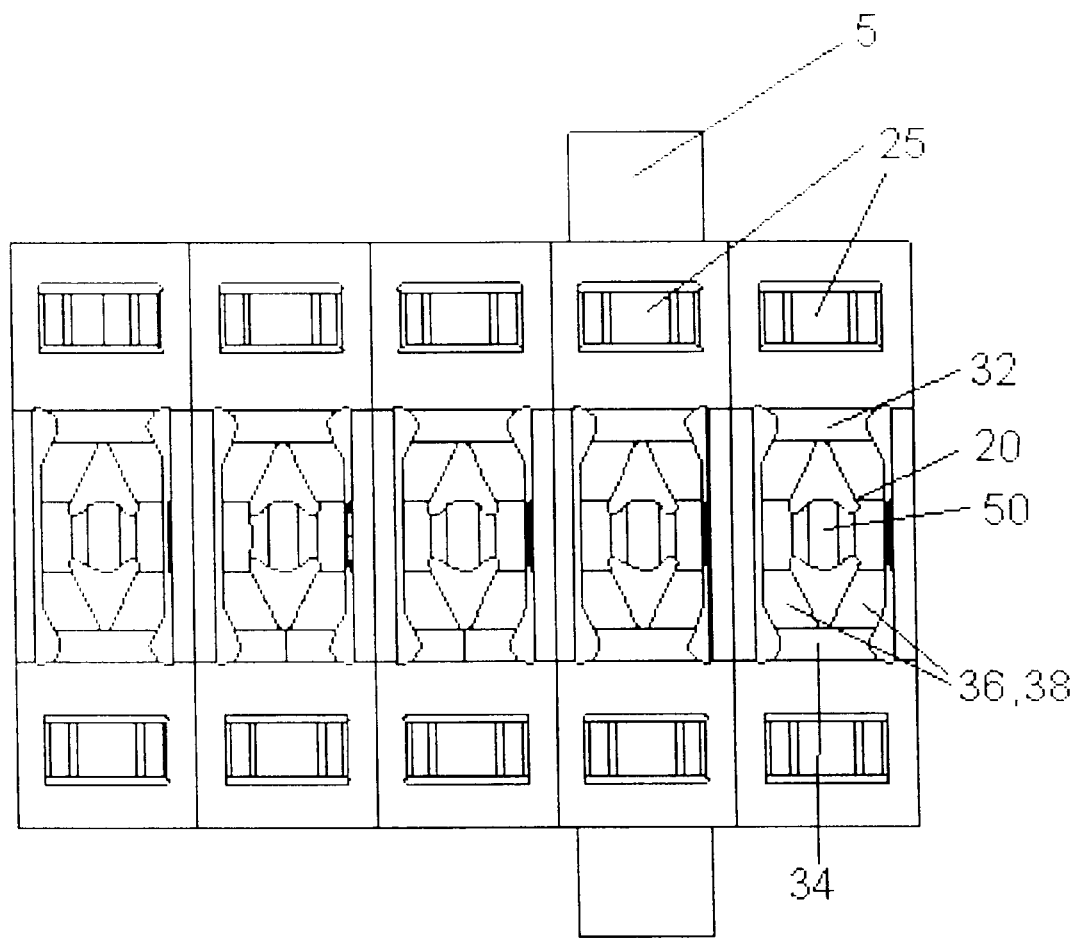
FIG. 6b is a side view of the spacer grid of this invention.

FIG. 5 is a perspective view of a spacer grid according to the preferred embodiment of this invention. FIG. 6a is a plan view of the above spacer grid. FIG. 6b is a side view of the spacer grid.

Figure 7:
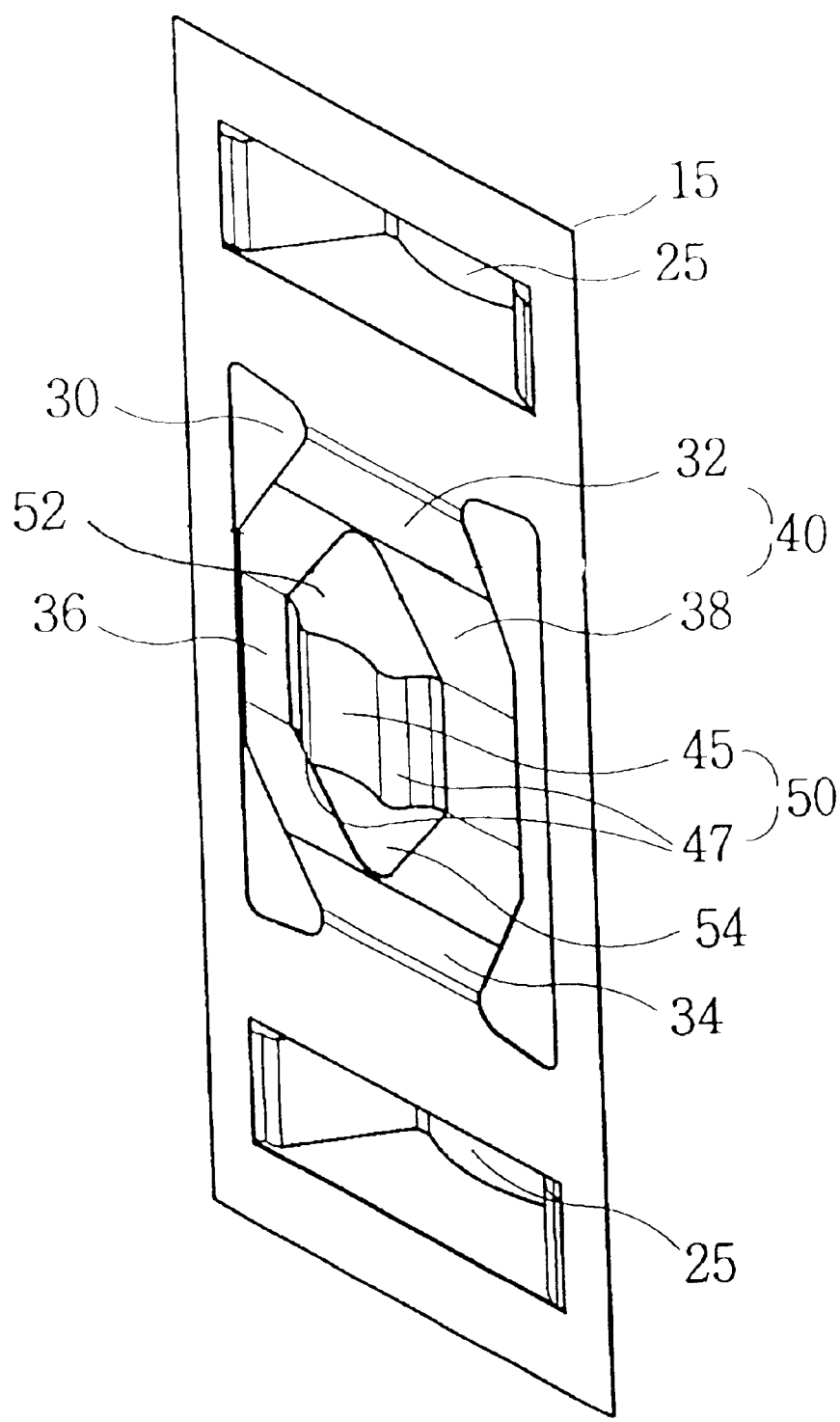
FIG. 7 is an enlarged perspective view of a unit strip included in the spacer grid of this invention.
Figure 8:
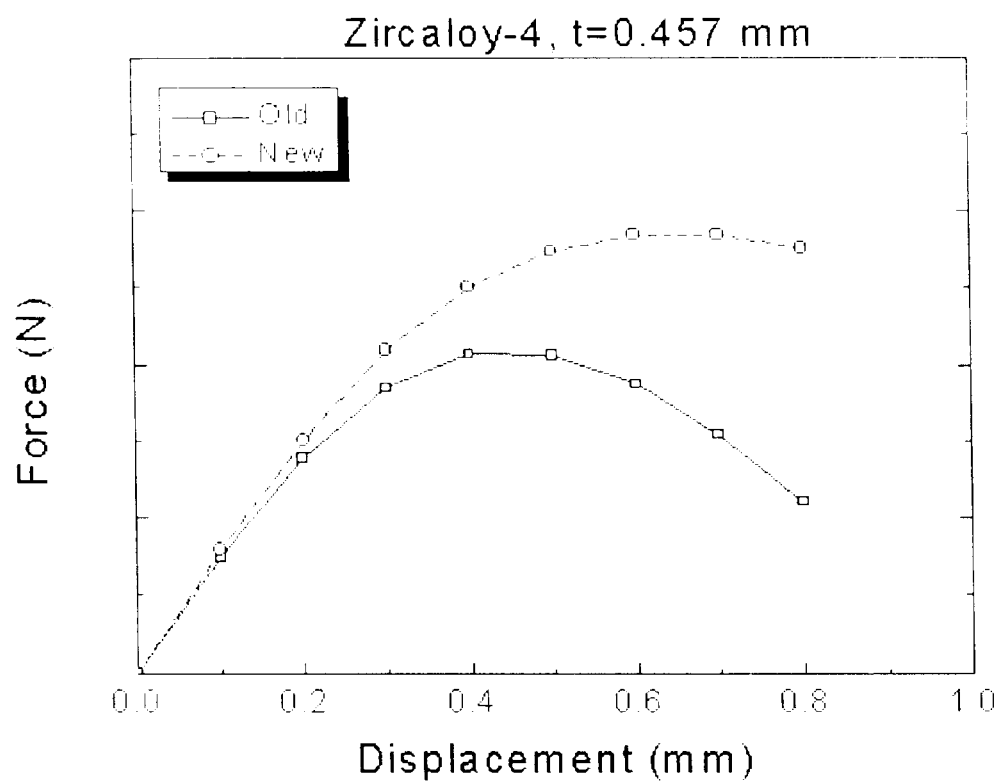
FIG. 8 is a graphic diagram showing the force applied from a fuel rod as a function of the displacement of a grid spring for the spacer grid of this invention.
Figure 9A:
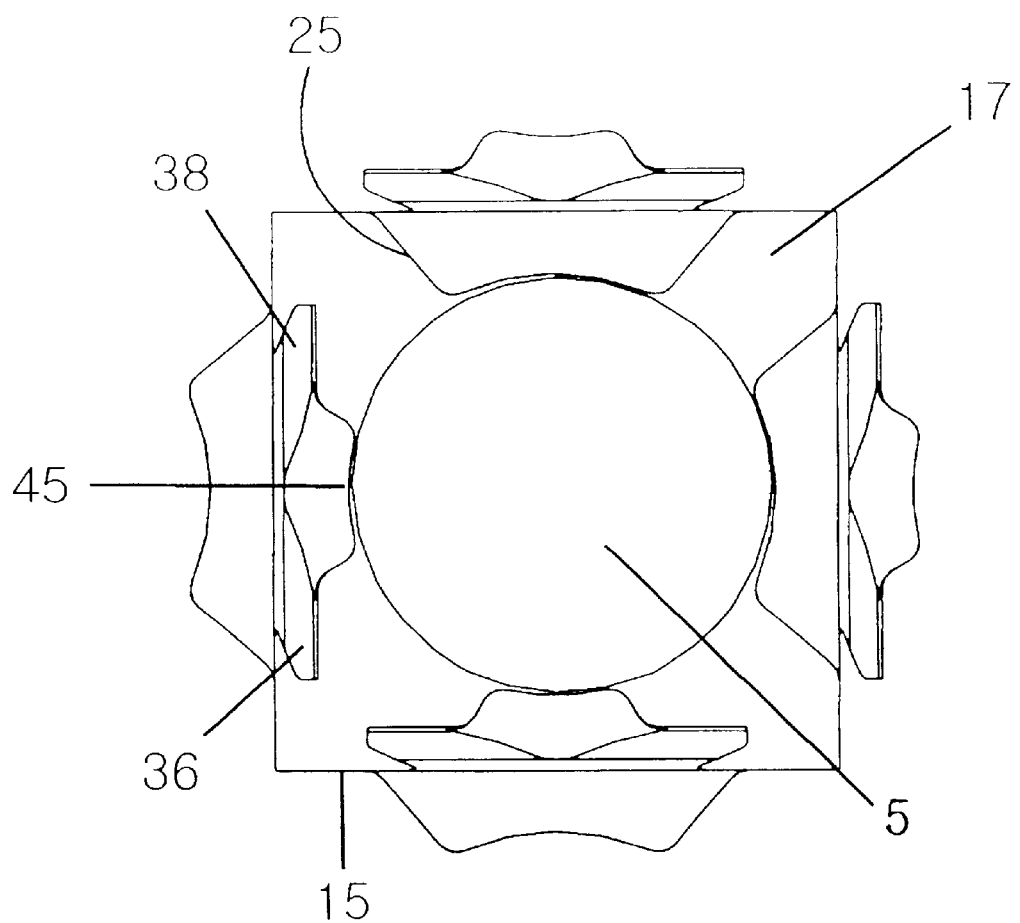
FIG. 9a is a plan view of a fuel rod cell of the spacer grid according to this invention, with one fuel rod placed and supported by grid springs and dimples within the cell.
Figure 9B:
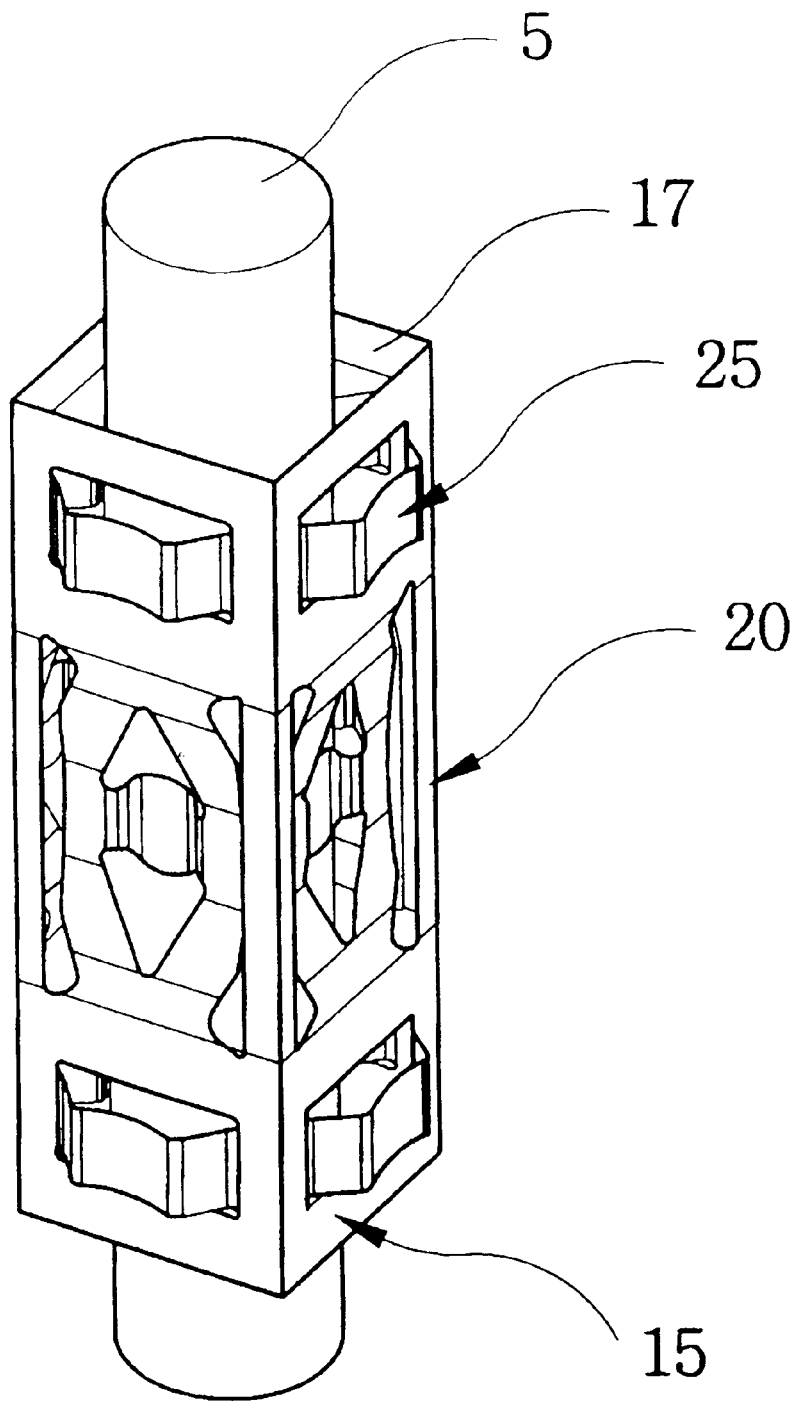

FIG. 7 is an enlarged perspective view of a unit strip included in the spacer grid of this invention. FIG. 8 is a graphic diagram showing the force applied from a fuel rod as a function of the displacement of a grid spring for the spacer grid of this invention. FIG. 9a is a plan view of a fuel rod cell of the spacer grid according to this invention, with one fuel rod placed and supported by grid springs and dimples within the cell. FIG. 9b is a perspective view of the fuel rod cell.

Figure 10:
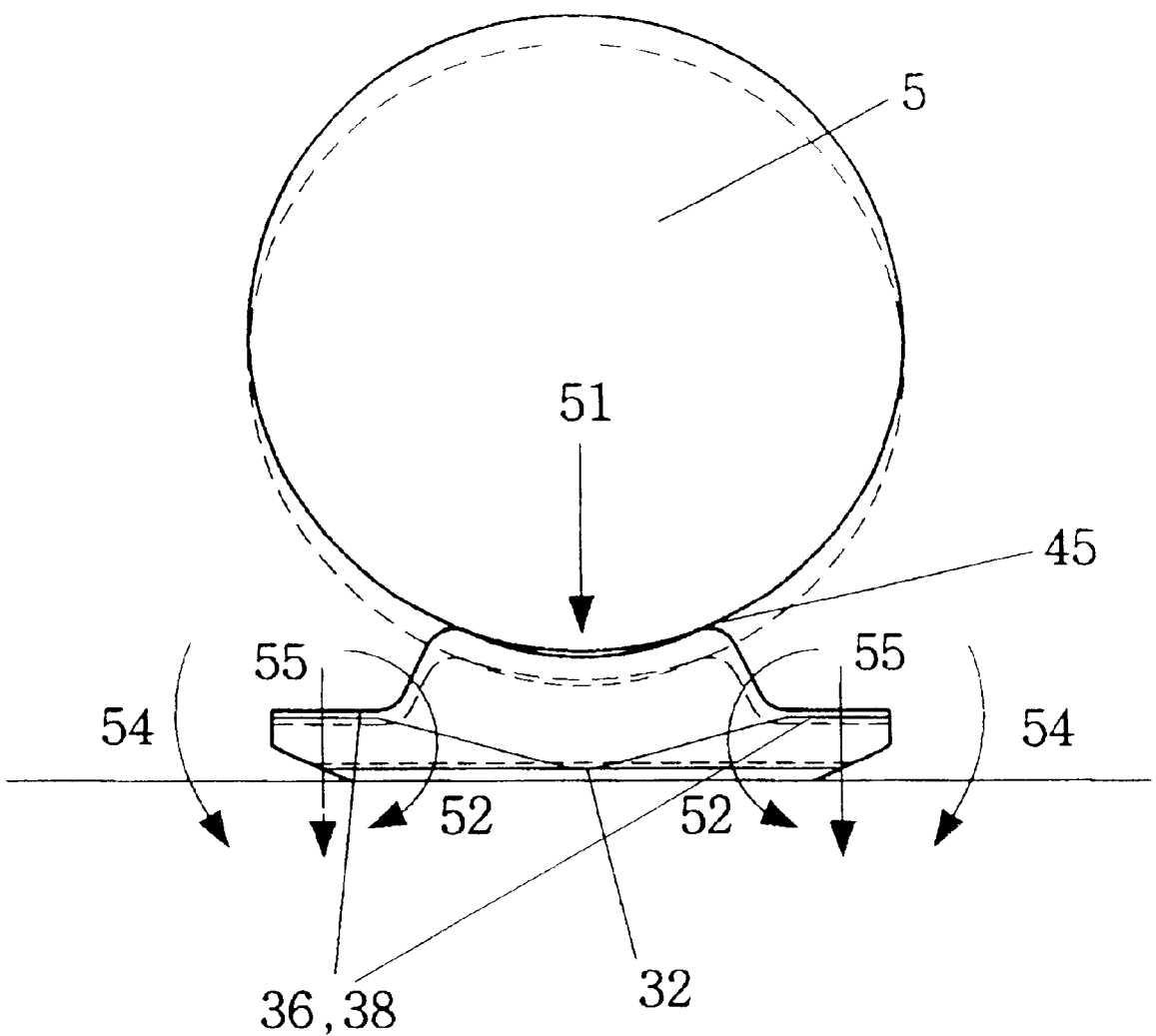
FIG. 10 is a view, showing a deformation of a grid spring due to the external force applied from the fuel rod in the spacer grid of this invention.

FIG. 10 is a view, showing a deformation of a grid spring due to the external force applied from the fuel rod in the spacer grid of this invention.

As shown in the drawings, the spacer grid 1 according to the present invention is fabricated with a plurality of inner strips 10, which are arranged while intersecting each other at right angles prior to being encircled with four perimeter strips 12, thus forming an egg-crate pattern.

The inner and perimeter strips 10 and 12 have the same height, and are each fabricated with a plurality of unit strips 15 arranged in parallel.

Due to the above-mentioned strip arrangement of the spacer grid 1, a plurality of unit fuel rod cells 17 are regularly defined in the spacer grid 1 such that each cell 17 is formed by four unit strips 15. A fuel rod 5 is fitted into each cell 17 while being isolated from the other fuel rods, thus forming a desired fuel assembly.

The construction of the unit strips 15 for the inner strips 10 is different from that of the unit strips 15 for the perimeter strips 12 as follows:

That is, each unit strip 15 for the inner strips 10, referred to simply as "first unit strip" in the following description, has one grid spring 20, which is vertically formed on the central portion of the first unit strip 15 while projecting in a direction as best seen in FIG. 7. Two dimples 25 are formed on the first unit strip 15 at positions above and under the grid spring 20 while projecting in a direction opposite to the spring 20.

However, each unit strip 15 for the perimeter strips 12, referred to simply as "second unit strip" in the following description, has only one grid spring 20 without having any dimples 25 different from the first unit strip 15. The grid spring 20 of each second unit strip 15 for the perimeter strips 12 is formed in the same manner as that described for the first unit strip 15 of the inner strips 10.

In the above spacer grid 1 of this invention consisting of the intersecting inner strips 10 and the perimeter strips 12 surrounding the intersecting structure of the inner strips 10, the inner strips 10 isolate the unit fuel rod cells 17 from each other and support the fuel rods 5 set within the cells 17, and so the first unit strip 15 for the inner strips 10 has one grid spring 20 and two dimples 25 which project from the unit strip 15 in opposite directions. However, the perimeter strips 12 do not support any fuel rod 5 outside them, and so the second unit strip 15 for the perimeter strips 12 is not provided with any dimples 25, different from the first unit strip 15 for the inner strips 10.

Even though the first and second unit strips 15 for the inner and perimeter strips 10 and 12 are different from each other in their structure, the grid springs 20 formed on the first and second unit strips 15 have the same shape and construction.

The construction of the grid springs 10, commonly formed on the first and second unit strips 15 for the inner and perimeter strips 10 and 12, is included in the most important characteristics of the present invention.

That is, the grid spring 20 of each unit strip 15 comprises a vertical support part 40 and a fuel rod support part 50. In order to form the vertical support part 40, an opening 30 is formed at the central area of each unit strip 15, with upper and lower base parts 32 and 34 extending downward and upward from the central portions of the top and bottom edges of the opening 30. The upper base part 32 also branches symmetrically into two bridge parts 36 and 38, which extend symmetrically downward until they are united at the lower base part 34. The fuel rod support part 50 is provided at the central portion of the spring 20. This fuel rod support part 50 comprises a conformal support part 45, which has a specifically bent shape and comes into surface contact with the external surface of a fuel rod 5 to elastically support the fuel rod 5, and two transverse connection parts 47, which extend outward from opposite outside edges of the conformal support part 45 while being specifically bent until the parts 47 are integrated with the central portions of the inside edges of the two bridge parts 36 and 38 into a single structure.

The conformal support part 45 has the same radius of curvature as that of the fuel rod 5, thus being brought into surface contact with the external surface of the fuel rod 5. In the present invention, it is preferable to shape the profile of the contact surface of the conformal support part 45 as a circular or elliptical profile. Such a circular or elliptical profile of the conformal support part 45 is suitable for enlarging the surface contact area of the part 45 relative to the fuel rod 5, in addition to accomplishing a desired uniform contact pressure distribution and reducing the peak stress of the part 45.

The two dimples 25 of each first unit strip 15 have the same radius of curvature as that of the fuel rod 5 in the same manner as that described for the conformal support part 45 of the grid spring 20. In addition, the contact surface of the dimples 25 is also appropriately curved at an angle suitable for accomplishing conformal contact of the dimples 25 with the fuel rod 5. As best seen in FIGS. 9a and 9b, the conformal support part 45 of the grid spring 20 and the conformal dimples 25 are brought into surface contact with the external surface of a fuel rod 5 when the rod 5 is set within a fuel rod cell 17 having the springs 20 and dimples 25.

In order to form the vertical support part 40 of the grid spring 20, the upper and lower base parts 32 and 34 commonly project from the unit strip 15 in the same direction through a bending process while extending downward and upward from the central portions of the top and bottom edges of the opening 30. The vertical support part 40 is also bent along the junction lines of the two base parts 32 and 34 and the two bridge parts 36 and 38. The vertical support part 40 is further bent at two or more positions on each of the two bridge parts 36 and 38 so as to generally project toward the fuel rod 5, thus elastically supporting load applied from the fuel rod 5 thereto through the conformal support part 45 coming into direct contact with the fuel rod 5.

In the preferred embodiment shown in the drawings, the upper and lower base parts 32 and 34 of the vertical support part 40 bend in the diverging direction, when the plane of each unit strip is datum plane. However, the two bridge parts 36 and 38 appropriately bend at several positions in the converging direction, when the plane of each unit strip is still datum plane. Therefore, the vertical support part 40 has a generally arc-shaped profile of the side face.

Since the vertical support part 40 is shaped through a bending process as described above, its strength is relatively lower than that of the fuel rod support part 50 having the conformal support part 45. Therefore, the vertical support part 40 is elastically deformed prior to a deformation of the conformal support part 45 in the case of an application of a force from the fuel rod 5 to the grid spring 20.

When the fuel rod 5 exerts a force to the fuel rod support part 50 of the grid spring 20, the two bridge parts 36 and 38 of the vertical support part 40 primarily absorb the force transmitted from the fuel rod support part 50. In such a case, as the two connection parts 47 of the fuel rod support part 50 are integrated with the central portions of the inside edges of the two bridge parts 36 and 38 into a single structure, a twisting moment 52 is applied to the inside edge of each of the two bridge parts 36 and 38 in a direction of FIG. 10. However, the two bridge parts 36 and 38 are also integrated with the unit strip 15 while converging to the upper and lower base parts 32 and 34, and so another twisting moment 54, opposite in direction to that of the twisting moment 52, acts around each bridge part 36, 38 at the junctions of the bridge parts and the base parts, thus somewhat offsetting the twisting moment 52. That is, a balance is formed between the two types of twisting moments 52, 54 having opposite directions each other, and so the twisting moment-induced deformation of the vertical support part 40 is minimized, but the spring 20 is mainly affected by a bending moment 55.

The spacer grid 1 of this invention is designed such that the inside edges of the two bridge parts 36 and 38 included in the vertical support part 40 of the grid spring 20 are less likely to be deformed by a twisting moment. The spacer grid 1 thus almost completely overcomes the problems, which have been experienced in the conventional spacer grids due to twisting moments causing both a divergence of the vertical support parts of the grid springs and a reduction in the radius of curvature of the conformal support parts of the springs, and making the conventional spacer grids fail to maintain their surface contact with fuel rods. In the spacer grid 1 of this invention, the grid springs 20 are designed to reduce a slide movement of the fuel rods 5 relative to the conformal support parts 45 of the springs 20, thus stably supporting the fuel rods in the fuel assembly, and thereby improving the soundness of the fuel assembly, in addition to reducing a fretting wear of the external surface of the fuel rods.

The vertical support part 40 of the grid spring 20 is bent at a plurality of positions, and has an enlarged elastic range, thus effectively and stably supporting the fuel rod while almost completely preventing a formation of gap between the fuel rod 5 and grid spring 20 irrespective of variable fuel rod support conditions inside a nuclear reactor. In addition, the grid springs 20 maintain their spring force capable of effectively supporting the fuel rod within the elastic limit of the springs 20.

FIG. 8 is a graphic diagram showing the force, applied from a fuel rod 5, as a function of the displacement of a grid spring 20 for the spacer grid 1 of this invention.

In the present invention, it should be understood that the base parts 32, 34 and the two bridge parts 36, 38 of the vertical support part 40 included in the grid spring 20 may be somewhat freely changed in their widths and the positions and angles of their bent portions as desired to obtain more optimized characteristic curves in the graphic diagram.

From FIG. 8, it is apparent that the grid spring 20 of this invention has a larger elastic range than that of the conventional grid spring, effectively supports the fuel rod within the elastic limit of the grid spring 20.

In the spacer grid 1 of this invention, as the upper and lower edges of the dimples 25 and the conformal support parts 45 of the grid springs 20 are bent back as well, the spacer grid 1 thus minimizes a fretting wear of the fuel rods 5 regardless of a sliding movement of the fuel rods relative to the conformal support parts 45 during an insertion of the fuel rods into the fuel rod cells 17 of the spacer grid or during an axial movement of the fuel rods within the cells 17 due to a lengthwise thermal growth of the fuel rods.

The grid spring 20 of this invention was invented after studying design factors capable of optimizing the restoring force of the grid springs, stress and contact pressure applied to the springs, which are the most important factors required to accomplish a desired stable support for the fuel rods 5 inside a nuclear reactor fuel assembly.

In order to optimize the restoring force of the grid springs, the springs are designed such that they are not plastically deformed, but remain within their elastic range even though they are somewhat excessively deformed to reach a maximum allowable displacement resulting from an addition of a displacement preset by a safety factor to a normal displacement of the grid springs during an insertion of the fuel rods into the spacer grids. The spacer grid of this invention is thus optimized with respect to the restoring force of its grid springs, and stably supports the fuel rods 5 while preventing vibration of the fuel rods during the effective life of the fuel rods.

The stress of the grid springs is optimized to minimize the equivalent stress generated in the grid springs due to a displacement of the springs during an insertion of fuel rods into the spacer grids of a nuclear fuel assembly or an axial slip of the fuel rods relative to the springs in the case of a lengthwise thermal growth of the fuel rods.

The contact pressure is optimized in terms of geometric variables to allow a uniform contact pressure distribution at the contact surface of the fuel rods and the conformal support parts 45 of the grid springs. That is, in a conventional spacer grid, the contact surface of the fuel rods and the conformal support parts of the grid springs does not have a uniform contact pressure distribution, thus sometimes causing a fretting wear of the fuel rods at the contact surface. The shape of the conformal support part 45 of the grid spring according to the present invention is designed in accordance with the optimized spring force, stress and contact pressure of the grid springs.

Figure 11:
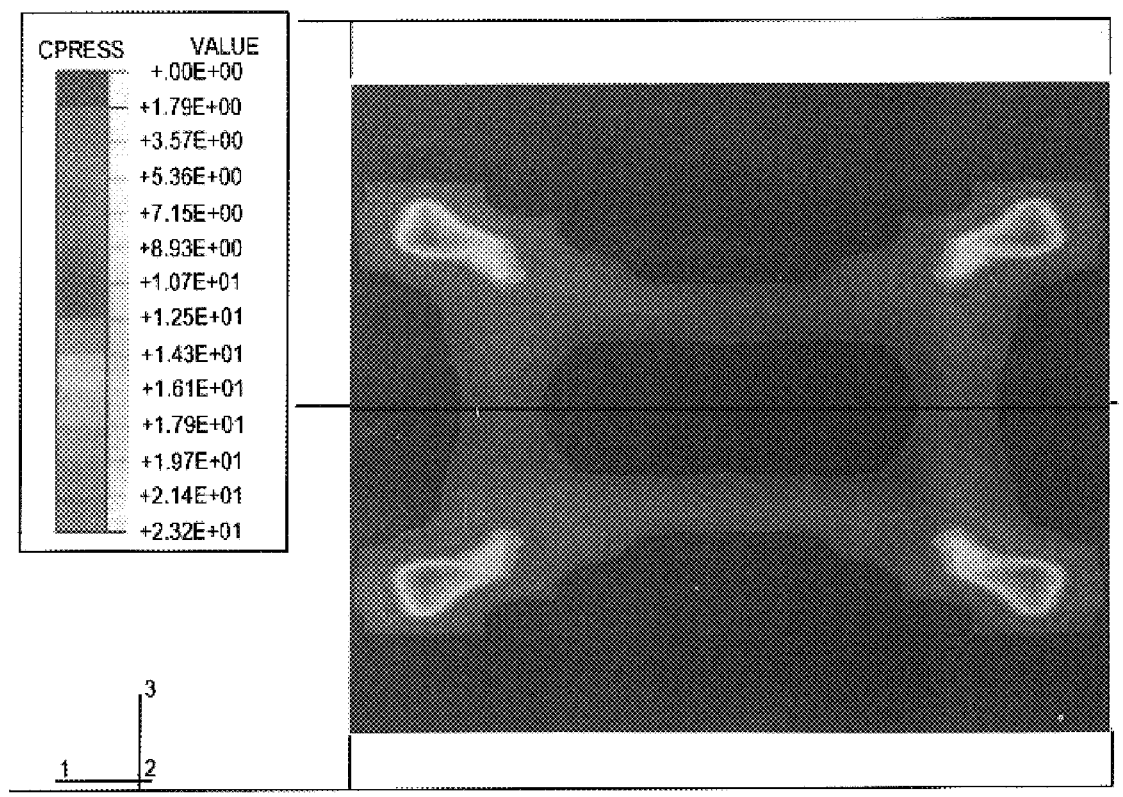
FIG. 11 is an FEM diagram, showing a contact pressure distribution in the case of 0.4 mm displacement of a conventional H-type grid spring.
Figure 12:
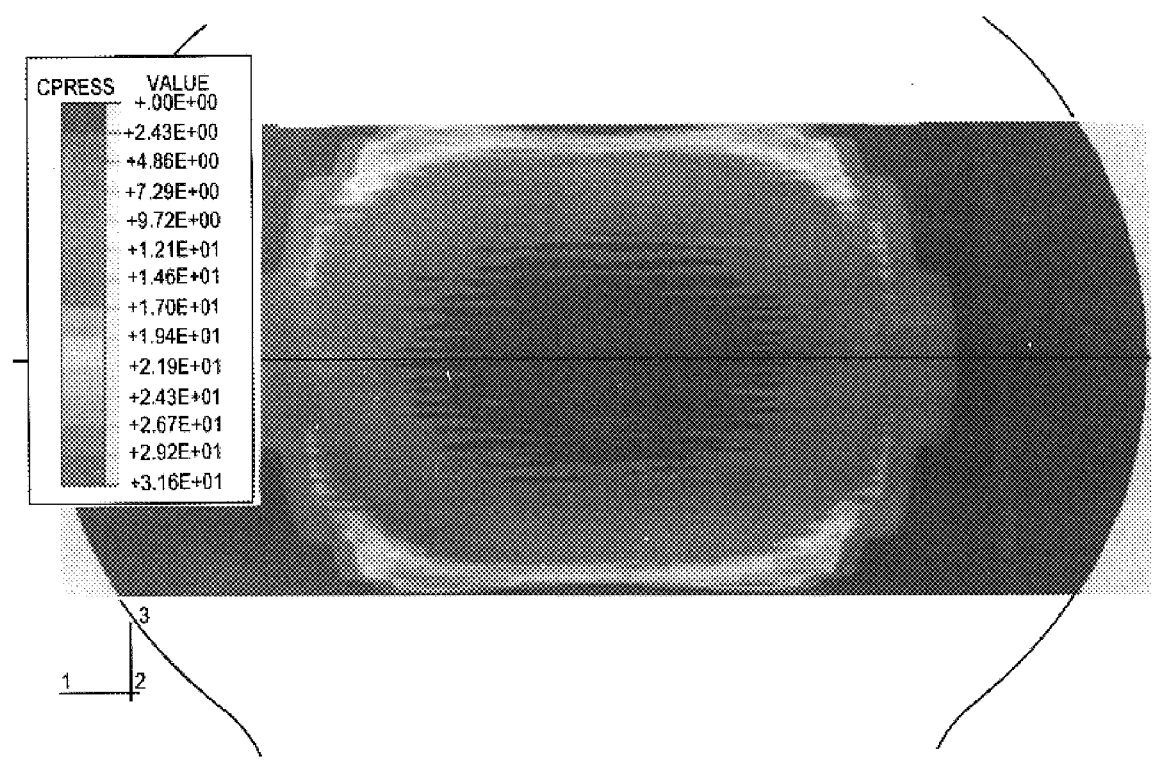
FIG. 12 is an FEM diagram, showing a contact pressure distribution in the case of 0.4 mm displacement of the grid spring according to this invention.

In order to accomplish the optimized spring force, stress and contact pressure of the grid spring 20 of the spacer grid, the vertical support part 40 of the grid spring is appropriately bent at a plurality of positions through a bending process, with two base parts 32 and 34 and two bridge parts 36 and 38 integrated into a single structure to form a desired vertical support part 40. FIGS. 11 and 12 are FEM diagrams, each showing a contact pressure distribution in the case of 0.4 mm displacement of a grid spring analyzed through a finite element method (FEM). Of the diagrams, FIG. 11 shows an FEM diagram of a conventional H-type grid spring, while FIG. 12 is an FEM diagram of the grid spring according to this invention. From the comparison of the two diagrams, FIGS. 11 and 12, it is apparent that the contact pressures in the spacer grid of this invention are uniformly distributed over a wide area different from the contact pressure distribution of the conventional spacer grid.

Figure 13:
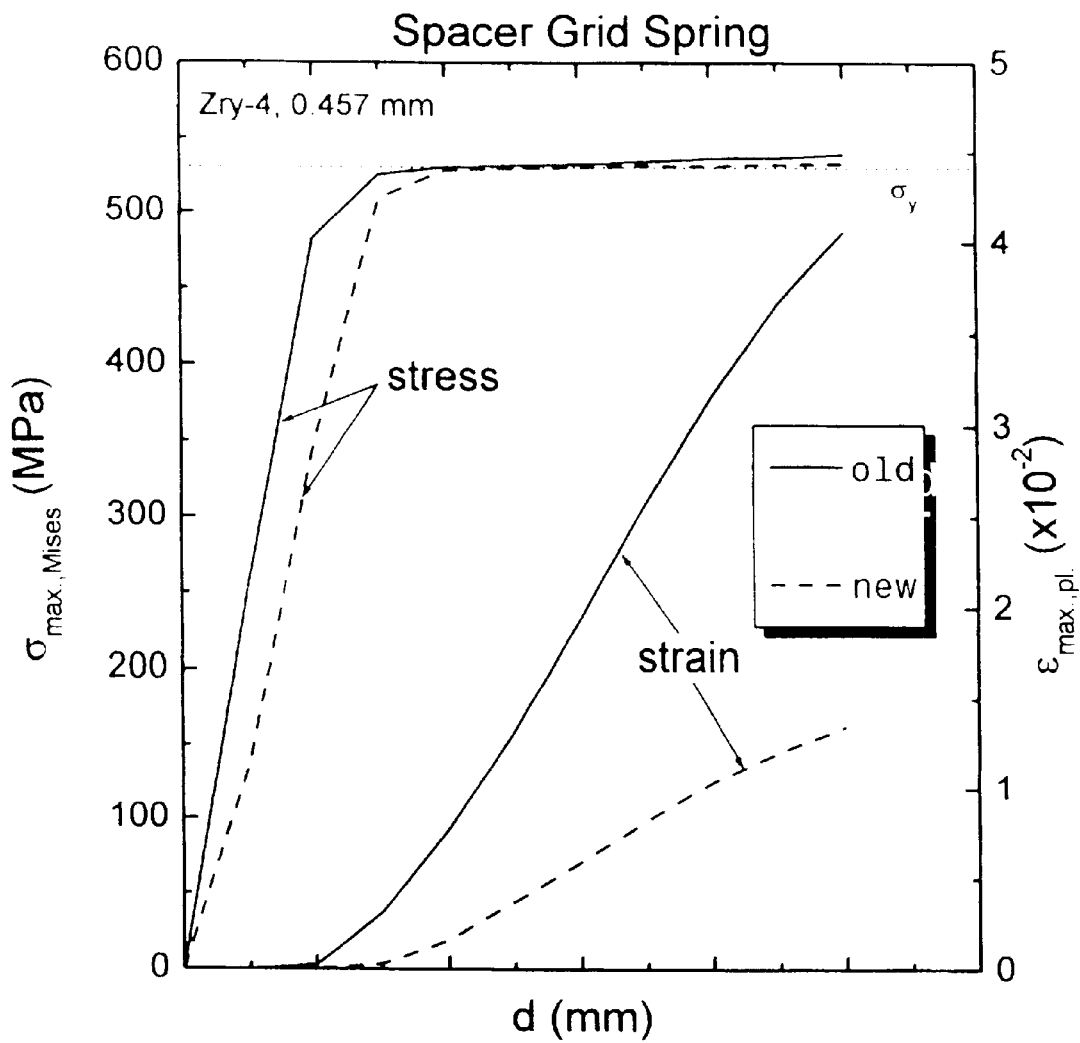
FIG. 13 is a graphic diagram, comparatively showing the characteristic curves of conformal stress and strain relative to a displacement of the conventional H-type grid spring and present grid spring.

FIG. 13 is a graphic diagram, comparatively showing the characteristic curves of equivalent stress and strain relative to a displacement of the conventional H-type grid spring and present grid spring. As shown in the diagram, the stress varies in a similar manner in the conventional grid spring and the present grid spring. However, in the case of strain, it is apparent that the grid spring of this invention is excellent than the conventional grid spring.

The spacer grid of this invention has the following operational effect. Since the vertical support part 40 of the grid spring 20 according to this invention is appropriately bent at several positions through a bending process, the strength of the vertical support part 40 becomes lower than that of the fuel rod support part 50 of the grid spring coming into direct contact with a fuel rod. Therefore, when the fuel rod exerts a force to the grid spring, the vertical support part 40 supports the force exerted from the fuel rod while being elastically deformed. In such a case, the vertical support part 40 is designed to minimize its deformation caused by a twisting moment, and is mainly deformed due to a bending moment. Therefore, it is possible to almost completely prevent a variation in the radius of curvature of the conformal support part 45 of the grid spring 20, in addition to minimizing the sliding movement of the fuel rod 5 relative to the conformal support part 45. The spacer grid 1 having such grid springs 20 stably supports the fuel rods 5 regardless of a variation in the fuel rod support conditions of the nuclear reactor fuel assembly, thus improving the soundness of the fuel assembly in addition to minimizing the fretting wear of the fuel rods.

Figure 14:
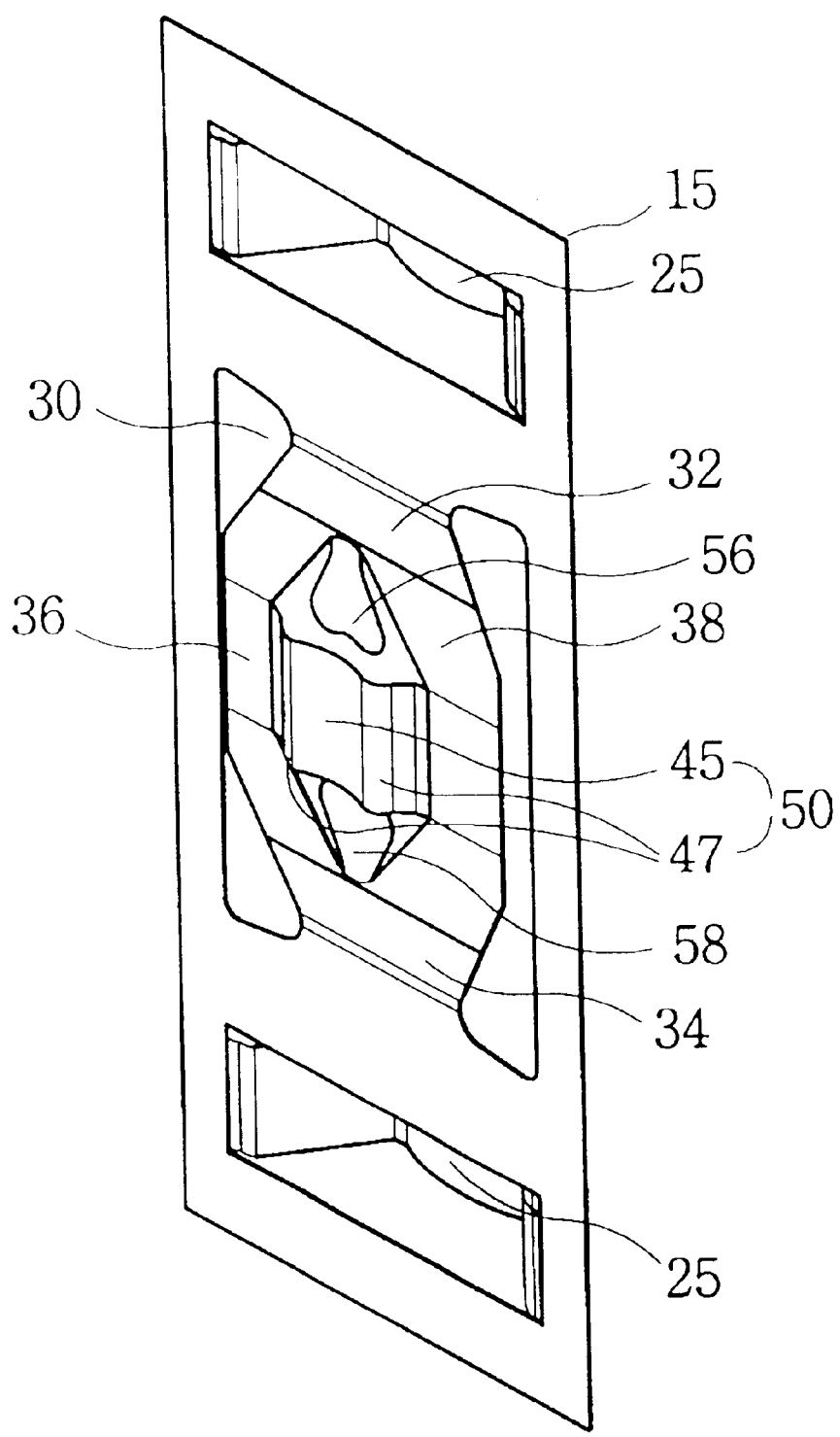
FIG. 14 is a perspective view of a further embodiment of the spacer grid in accordance with the present invention.

In another embodiment of the present invention, as shown in FIG. 7, the grid spring 20 of the present invention have upper and lower opening 52 and 54 surrounded by the vertical support part 40 and the fuel rod support part 50. In addition, as shown in FIG. 14, the grid spring 20 of the present invention further include upper and lower extending part 56 and 58 each extending from center of upper/lower base part 32/34 of the vertical support part 40 and partially enclosing said upper/lower opening 52/54. Consequently, efficiency of the flow mixing between adjacent fuel rod cells in the spacer grid is increased and the high frequency vibration of the fuel rods and strips due to the cross flow is restrained with effect.

As described above, the present invention provides a spacer grid for nuclear reactor fuel assemblies with a grid spring capable of maintaining conformal contact with a fuel rod and having an enlarged elastic range. The object of the present invention is to overcome the problems, which have been experienced in the conventional spacer grids, and in which the vertical support parts of each grid spring are affected by both a bending moment and a twisting moment in the case of an exertion of a force from the fuel rod to the grid spring, thus allowing the grid spring to lose its desired conformal contact with the fuel rod in accordance with a displacement of the spring caused by the force exerted from the fuel rod and fail to stably support the fuel rod within the fuel assembly.

In the spacer grid for nuclear reactor fuel assemblies according to this invention, the grid springs are designed to maintain conformal contact with fuel rods and have an enlarged elastic range. Even when the fuel rods exert a force to the grid springs so as to deform the springs, the conformal support parts of the springs continuously maintain their conformal contact with the fuel rods, while the vertical support parts of the springs are deformed by the force transmitted from the fuel rods through the conformal support parts. In such a case, the vertical support parts are mainly deformed by a bending moment except for a twisting moment. The spacer grid of this invention thus stably supports the fuel rods in a fuel assembly. In addition, the shape of the conformal support parts of the grid springs is optimized to a circular or elliptical profile, which accomplishes a desired uniform contact pressure distribution and reduces the peak stress of the conformal support parts, thus reducing a fretting wear of the fuel rods.

Due to the conformal surface contact of the grid springs and dimples with the fuel rods, the springs stably support the fuel rods even when a force is exerted to the fuel rods in any direction due to variable operational conditions of the nuclear reactor. The conformal surface contact of the grid springs and dimples with the fuel rods also reduces a fretting wear of the fuel rods regardless of a repeated application of a force to the contact surfaces of the grid springs, dimples and fuel rods. Such enlargement of the elastic range of the grid springs allows the springs stably support the fuel rods within the spacer grid during the effective life of the fuel rods.

Moreover, the spacer grid of the present invention may be preferably used for supporting a plurality of tubes or pipes situated lengthwise in an industrial machine using fluid feeding pipelines, boilers or heat exchangers while reducing occurrence of fracture of the tubes or pipes caused by frictional abrasion, fatigue or vibration.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A spacer grid for placing and supporting a plurality of longitudinal fuel rods in a nuclear reactor fuel assembly, comprising a plurality of inner strips arranged while intersecting each other at right angles prior to being encircled with four perimeter strips, thus forming an egg-crate pattern, said inner and perimeter strips each being fabricated with a plurality of unit strips arranged in parallel, and forming a plurality of unit rod cells for receiving and supporting the fuel rods therein while isolating the fuel rods from each other, each unit strip of said inner strips having one grid spring formed on a central portion of the unit strip while projecting in a direction, and two dimples formed on the unit strip at positions above and under the grid spring while projecting in a direction opposite to the grid spring, and each unit strip of said perimeter strips having one grid spring formed on a central portion of the unit strip while projecting in a direction, wherein said grid spring comprises:

a vertical support part including:
an opening formed at the central portion of the unit strip;
upper and lower base parts extending downward and upward from central portions of top and bottom edges of said opening; and
two bridge parts branched from the upper base part and extending symmetrically downward until they are united at the lower base part; and a fuel rod support part including:
a conformal support part brought into surface contact with an external surface of a fuel rod; and
two transverse connection parts extending outward from opposite outside edge of said conformal support part while being specifically bent, and integrated with the central portions of inside edges of said two bridge parts into a single structure, thus connecting the fuel rod support part to the vertical support part wherein said vertical support part including said upper and lower base parts and said two bridge parts has a strength which is lower than that of said fuel rod support part having said conformal support part wherein the vertical support part is elastically deformed before deformation of the conformal support part so as to allow the conformal support part to maintain a conformal contact with the fuel rod upon application of a force from the fuel rod to the grid spring.

2. The spacer grid according to claim 1, wherein said vertical support part has a plurality of bent portions and projects from the unit strip toward the fuel rod, thus elastically supporting load applied from the fuel rod thereto through the conformal support part 45 coming into direct contact with the fuel rod.

3. The spacer grid according to claim 1, wherein said conformal support part has the same radius of curvature as that of the fuel rod, thus being brought into surface contact with the external surface of the fuel rod, said conformal support part also has a circular or elliptical profile at its contact surface, thus enlarging a surface contact area thereof relative to the fuel rod, in addition to accomplishing a uniform contact pressure distribution and reducing a peak stress thereof.

4. The spacer grid according to claim 1, wherein said vertical support part includes the upper and lower base parts, two bridge parts and a plurality of bent portions.

5. The spacer grid according to claim 1, wherein said vertical support part is bent at a plurality of portions so as to have an enlarge elastic range and elastically supporting the fuel rod regardless of a variation in fuel rod support conditions in the nuclear reactor, and maintaining a spring force capable of effectively supporting high load that is applied from the fuel rod and exceeds the expected maximum load and the elastic limit of the grid spring.

6. The spacer grid according to claim 1, wherein said base parts and bridge parts of the vertical support part are changeable in their widths and positions of their bent portions in accordance with design objects, thus providing optimized spring characteristic curves.

7. The spacer grid according to claim 1, wherein said grid spring have upper and lower opening surrounded by the vertical support part and the fuel rod support part, and further include upper and lower extending part each extending from center of upper/lower base part of the vertical support part and partially enclosing said upper and lower opening.

* * * * *

UNITED STATES PATENT AND TRADEMARK OFFICE
CERTIFICATE OF CORRECTION

PATENT NO.   : 6,707,872 B2
DATED        : March 16, 2002
INVENTOR(S)  : Kyung Ho Yoon et al.

It is certified that error appears in the above-identified patent and that said Letters Patent is hereby corrected as shown below:

Column 12,
Line 53, the word "edge" should be corrected to read as -- edges --.

Column 14,
Line 1, the word "enlarge" should be corrected to -- enlarged --.

Signed and Sealed this

Third Day of August, 2004

JON W. DUDAS
*Acting Director of the United States Patent and Trademark Office*